United States Patent [19]

Marshall

[11] Patent Number: 4,660,996
[45] Date of Patent: Apr. 28, 1987

[54] BEARING AND SEALING MEMBER FOR MOVEABLE SHAFT

[75] Inventor: Charles R. Marshall, Warwick, R.I.

[73] Assignee: Dixon Industries Corporation, Bristol, R.I.

[21] Appl. No.: 818,348

[22] Filed: Jan. 13, 1986

[51] Int. Cl.$^4$ .............................................. F16C 33/74
[52] U.S. Cl. ..................................... 384/138; 384/125
[58] Field of Search .................. 384/138, 125, 97, 98, 384/147

[56] References Cited

U.S. PATENT DOCUMENTS

| | | | |
|---|---|---|---|
| Re. 31,110 | 12/1982 | Black | 16/46 |
| 3,243,240 | 3/1966 | Arthur | 384/138 |
| 3,380,791 | 4/1968 | Peck | 384/138 |
| 3,837,717 | 9/1974 | Kipple et al. | |
| 3,991,144 | 11/1976 | Diener | 261/36 A |
| 3,994,545 | 11/1976 | Van Dorn | |
| 3,998,505 | 12/1976 | Frost et al. | |
| 4,015,949 | 4/1977 | Baker et al. | 428/653 |
| 4,053,013 | 10/1977 | Guba | 165/86 |
| 4,129,343 | 12/1978 | Janssen | |
| 4,162,110 | 7/1979 | Gardella | |
| 4,263,695 | 4/1981 | Duncan et al. | 17/11 |
| 4,296,952 | 10/1981 | McCracken | 285/98 |

Primary Examiner—Lenard A. Footland
Attorney, Agent, or Firm—Morgan & Finnegan

[57] ABSTRACT

A one-piece, self-lubricating, thermoplastic bearing and sealing member suitable for supporting a moveable shaft and forming a seal around the circumference thereof. The bearing and sealing member comprises a tubular shaped body, an inner annular wall portion of which may be radially cut to form a recess and one or more flanges of preselected length and thickness. Alternately the sealing and bearing member may be molded with the flange and recess formed in situ. The flanges may have an inner diameter which is smaller than the outer diameter of the shaft or may have an outer diameter which is larger than the outer diameter of the bearing and sealing member. The flanges can be bent, preferably in the vicinity of their respective bases to a preselected angle below 20° relative to a transverse axis of the sealing member. When a moveable shaft is disposed in an annular conduit with the bearing and sealing member, the flange portions of the bearing and sealing member within the conduit are bent to said preselected angle and are placed in contact with the annular outer surface of the shaft, providing sealing engagements therebetween.

16 Claims, 7 Drawing Figures

BEARING AND SEALING MEMBER FOR MOVEABLE SHAFT

BACKGROUND OF THE INVENTION

1. Field of the Invention

This invention relates to bearing and seal means for a moveable shaft. More particularly, the invention relates to a self-lubricating, thermoplastic shaft bearing and seal of simple, one-piece, construction for supporting a shaft and forming a seal around the circumference thereof.

2. Description of Prior Art

A wide variety of seals and/or bearings suitable for use with shafts, both rotary and reciprocating types, are known. Such seals or bearings are utilized in diverse applications, in pumps, fans, compressors and agitators, carburetors and the like. Bearing sealing means for rotatable or moveable shafts, used in automobile carburetors, for example, are described in U.S. Pat. Nos. 4,053,013 and 3,991,155.

Carburetors prepare and supply a mixture of fuel vapor and air, in proper proportion for efficient combustion, to cylinders of an engine. One of the important controls on a carburetor is the throttle valve which controls the amount of air-fuel mixture that enters the intake manifold. This control is used to change the speed of a vehicle. The throttle valve typically is round disk mounted on a rotatable shaft, so that it can be tilted at various angles in the carburetor throttle valve body. It is coupled by suitable linkage to the accelerator pedal in a vehicle. Depressing the pedal opens the throttle valve, permitting an increased amount of air-fuel mixture to reach the manifold. The shaft is supported by bearings on opposite sides of the carburetor housing.

Among bearings in common use are those which consist of fibers that are initially woven, twisted or braided into strands or shredded and then pressed or formed into coils, spirals, rings or other appropriate shapes. Useful materials employed to make such bearings include asbestos fabric, braided and twisted asbestos fibers, rubber and duck flax fibers, jute fibers and metallic fibers.

Generally, such types of bearings require lubrication in order to facilitate assembly with appropriate shafts and to extend their useful life. In addition, they also normally require appropriate packing or sealing means, such as sealing rings, which may generally be made of the same materials and which also require lubrication. Lack of lubrication causes both the bearing and sealing means to become hard and to lose their resiliency which results in increased friction, a diminished useful life, and consequently, increased operating costs. Moreover, such bearings and the sealing means employed therewith are disadvantageous in that the sealing means not only require frequent lubrication but also because of the quantity of fluid flow necessary to lubricate sufficiently both the bearing per se, as well as the sealing means.

The use of air lubricated bearings comprised of polytetrafluoroethylene (PTFE) (U.S. Pat. No. 3,837,717 to Kipple et al.) and oil or grease lubricated bearings comprised of polyphenylene sulfide (PPS) (U.S. Pat. No. 4,015,949 to Baker) is known. Baker also suggests a so called dry bearing by including PTFE with the PPS. U.S. Pat. No. 4,263,695 describes the use of a water lubricated bearing comprised of PPS and glass. And U.S. Reissue Pat. No. 31,110 to Black describes a solid axle wheel support in which there is employed a generally tubular thermoplastic bearing sleeve provided on its opposite axial ends with radially extending flanges which perform a sealing function.

SUMMARY OF THE INVENTION

1. Objects of the Invention

It is an object of this invention to provide a bearing and sealing member having a conduit therethrough and having one or more flanges radially extending away from the walls of the conduit, the flange surfaces being capable of providing separate and discrete sealing surfaces with a shaft inserted in the conduit.

An object of this invention is to provide a one-piece, thermoplastic bearing and sealing member which is self-lubricating in use and which maintains an effective seal with minimum frictional drag between the flange(s) of the sealing member and an annular surface moving relative thereto or relative to which the flange(s) move(s).

Another object of this invention is to provide a thermoplastic bearing and sealing member which is durable and has resilient flanges radially extending from walls of a conduit through the member, the flanges capable of self-adjusting to maintain a sealing engagement between a moveable shaft placed within the conduit and peripheral portions of the flanges while compensating for such wear as does occur.

An object of this invention is to provide a thermoplastic bearing and sealing member having a conduit extending axially therethrough and having one or more radially extending, resilient flange portions therewithin which can be bent, in the vicinity of their respective bases, under pressure, from an initial position to form a preselected angle with a transverse axis of the conduit.

It is an object of this invention to provide a shaft bearing and seal combination which can be easily assembled.

It is another object of this invention to provide a shaft bearing and seal combination which can be assembled from either end.

Other objects and advantages of the invention will become apparent from the following description read in conjunction with the accompanying drawings in which like parts bear like reference numerals.

2. Brief Description of the Drawings

3. Brief Description of the Invention

Figure 1:
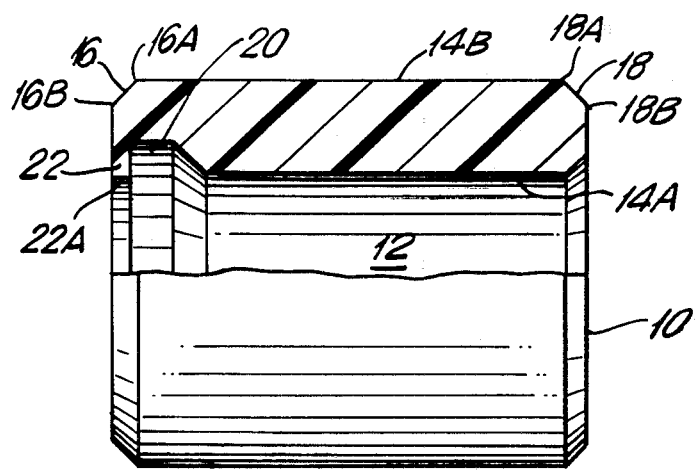
FIG. 1 is an elevational view partly in section of a bearing and sealing member embodying the invention shown prior to deflection of its sealing surfaces from their initial position.

Briefly, in one aspect this invention concerns a one-piece, self-lubricating, thermoplastic bearing and sealing member suitable for sealing a moveable shaft, said bearing and sealing member comprised of an annular shaped body having an inner annular conduit extending axially therethrough, the conduit having a cross-sectional area adapted to receive the shaft, the walls of said conduit having a radially inwardly extending annular recess and a resilient flange radially extending from said walls into said conduit, the recess being located in the vicinity of one axial end of the conduit and the flange being located adjacent to and axially outward of said recess, the flange being capable of being bent to a preselected angle below about 20° relative to a transverse axis of the conduit and having a memory which urges it to return to its initial prebent position, the flange being integrally formed with the body and projecting radially inwardly into said conduit to an extent that when the shaft is inserted in the conduit at one end thereof nearest said flange and recess, the flange is bent into said recess by the axial disposition of the shaft within the conduit to said preselected angle, and when the shaft is inserted in the conduit at the opposite end thereof farthest from said flange and recess, the flange is bent by the axial disposition of the shaft within the conduit to said preselected angle away from said recess, peripheral portions of said flange being placed in continuous contact under tension with the outer circumference of the shaft providing a sealing engagement therebetween when said shaft is inserted within the conduit.

In another aspect, this invention relates to a one-piece, self-lubricating, thermoplastic bearing and seal member suitable for carrying a throttle shaft located within a carburetor assembly, said shaft capable of rotatably moving within said assembly about its longitudinal axis, or reciprocally moving within said assembly, said bearing and seal member comprised of an annular shaped body having a central opening adapted to mate with said shaft, an inner wall portion of said annular shaped body containing an annular groove dimensioned so as to define a flexible and resilient flange at one end of the annular shaped body, said flange extending away from said annular shaped body at a preselected angle below about 20° relative to a transverse axis thereof, the flange portion of said annular shaped body having an outer diameter which is larger than the outer diameter of said annular shaped body and an inner diameter which is substantially the same as said central opening, said flange, upon application of a radially inward force thereto, capable of being bent so that its inner diameter is smaller than the diameter of said central opening, said bearing and seal member adapted for disposition in an annular space between said throttle shaft and the carburetor housing so that a peripheral wall portion of the bearing and seal member is fixedly secured within said carburetor housing, and so that the peripheral portion of said flange is bent radially inwardly and placed in continuous contact under tension with the annular outer surface of said throttle shaft, providing a discrete sealing engagement therebetween.

4. Detailed Description of the Invention

Figure 3:
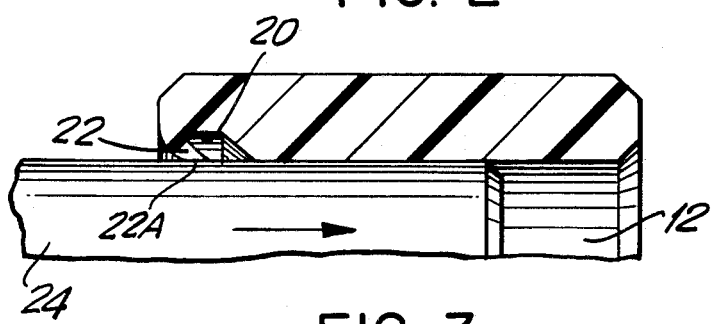
FIG. 3 is a partial elevational view in section of the bearing and sealing member of FIG. 1 shown in association with a partial view of a shaft which has been inserted into the end of the bearing and sealing member provided with a sealing flange.
Figure 4:
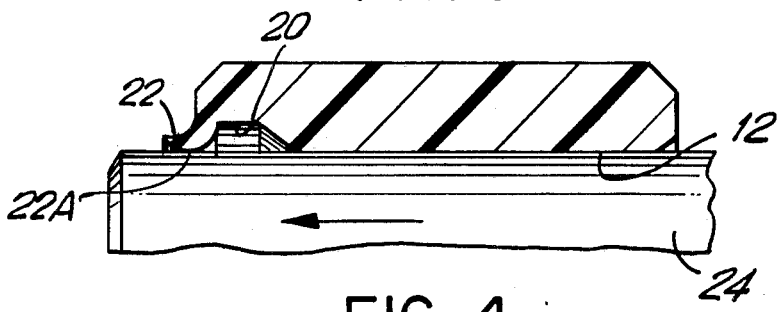
FIG. 4 is a partial elevational view in section of the bearing and sealing member of FIG. 1 shown in association with a partial view of a shaft which has been inserted into the end of the bearing and sealing member opposite to the end provided with the sealing flange.

Referring to FIG. 1, an embodiment of the invention is shown in application to an annular shaped bearing and sealing member 10 having an annular conduit or bore 12 extending axially therethrough. The annular conduit 12, shown as cylindrical in FIGS. 1, 3 and 4 is formed within the member 10 so that there are predetermined clearances between the annular inner walls 14A of the conduit and the annular peripheral surface of a cylindrical shaft (not shown) to be inserted into the conduit 12. The member 10 may have beveled shoulders 16 and 18 at opposite ends thereof to facilitate pressing the member 10 into a bored hole. The shoulders 16 and 18 have upper and lower portions 16A and 16B and 18A and 18B, respectively. Ends 16A and 18A are coplanar with the peripheral annular wall 14B of the bearing and sealing member 10.

As shown in FIG. 1, the walls 14A of the conduit 12 contain a radially inwardly extending, annular recess or groove 20. The recess 20 is located in the vicinity of one axial end of the conduit 12. A flange 22 is located adjacent to and axially outward of the recess at one end of the conduit 12. The flange 22 extends radially towards the conduit 12 in an initial position and has a thickness which permits it to be flexibly bent, upon application, from its initial position to a preselected angle below about 20° relative to a transverse axis of the conduit 12. The axial width of the recess 20 within the conduit 12 is sufficient to accomodate flexing of the flange 22 into the recess 20 by axial deposition of a shaft into the conduit 12.

Figure 2:
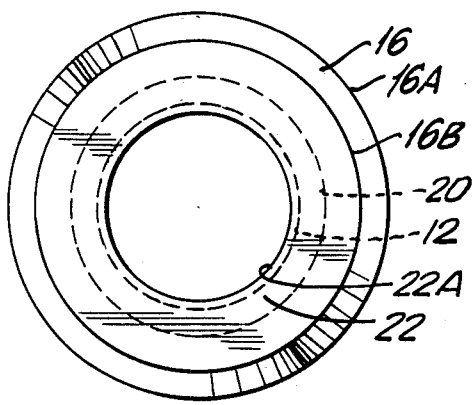
FIG. 2 is an end view of the bearing and sealing member of FIG. 1 showing in broken lines the cross-sectional area of a recess within the walls of a conduit or bore extending through the bearing and sealing member, and the cross-sectional area of the conduit.

Referring to FIG. 2, it can be seen that the cross-sectional area of the recess 20 is larger than the cross-sectional area of the conduit 12, which in turn is larger than the cross-sectional area of the clearance between the peripheral portions 22A of the flange 22. The cross-sectional area of recess 20 is dimensioned so as to permit predetermined deflection of flange 22 into recess 20 when the flange 22 is in sealing engagement with the circumferential surfaces of a shaft 24 (FIG. 3) within the conduit 12. Similarly, the cross-sectional area of the conduit 12 is dimensioned to accomodate the cross-sectional area of the shaft in a mating and aligned relationship.

As shown in FIG. 1, the flange 22 is initially radially aligned with a transverse axis of the bearing and sealing member 10. When shaft 24 is inserted into the conduit 12 at the end having the flange 22, the flange 22 is axially displaced by the shaft 24 (FIG. 3) and bent axially inwardly in the conduit to a predetermined angle below 20° relative to a transverse axis of the conduit 20. Recess 20 accomodates the deflection of flange 22 within conduit 12.

Alternately, shaft 24 may be inserted into the conduit 12 at the end farthest from that having flange 22 (FIG. 4). Then, the flange 22 is axially displaced by the shaft 24 and bent axially outwardly of the conduit to a predetermined angle below 20° relative to a transverse axis of the conduit 20. The flange 22 may be bent, preferably at or in the vicinity of its base, so that its radial length forms a preselected angle below about 20°, generally between about 2° and 20°, and preferably between 3° and 11°, relative to a transverse axis of the conduit 20. The resiliency of the flange 22 permits it to be further bent to facilitate installation of the shaft 24 in the conduit 12, upon application of pressure.

Flange 22 not only is resilient, but it has a memory which urges it to return to its initial prebent position. When being positioned in the conduit 12, peripheral annular surfaces of the shaft 24 are placed in sealing engagement with peripheral annular surfaces 22A of the flange 22. When the shaft 24 is aligned in situ within the conduit 12, (FIGS. 3 and 4), the memory of the flange 22 causes its peripheral annular surface 22A to be urged radially against the outer annular surface of the shaft 24 so as to continuously compensate for any irregularities of the outer surface of the shaft 24 and maintain the sealing engagement therebetween.

While the invention has been shown with a single flange 22 at one end of the bearing and sealing member, it is desirable in many instances to provide more than one flange within conduit 12. Thus, the bearing and sealing member 10 may have flange 22 at opposite ends of the conduit 20, or, one or more flanges centrally disposed within the conduit 20 and having recesses 20 on adjacent sides thereof to permit deflection of the flanges in axially opposite directions into an adjacent recess.

Figure 5:
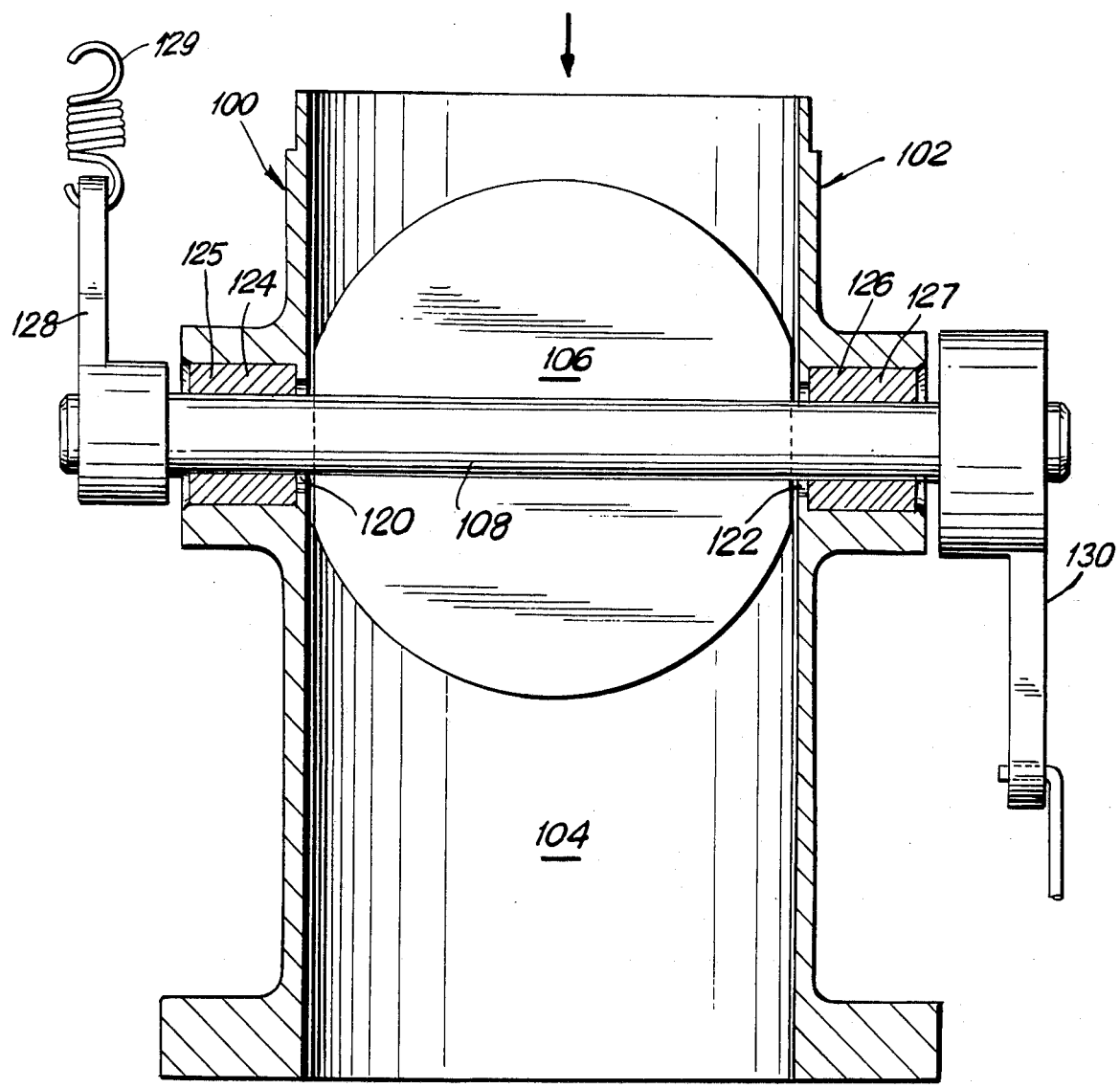
FIG. 5 is a plan view of a section of a known carburetor construction with the intake manifold housing cut away.

Referring now to the drawings and to FIG. 5 in particular, there is illustrated a section of a known carburetor having intake manifold housing portions 100 and 102 defining an intake opening 104 therebetween, a circular throttle plate 106 and a throttle shaft 108. The throttle plate 106 is positioned in the intake manifold opening between the manifold housing portions 100 and 102 and is rotatably mounted about the throttle shaft 108. Openings 120 and 122 in manifold housing portions or walls 100 and 102, respectively, accomodate the throttle shaft 108 which extends therethrough. The throttle shaft is positioned within bearing members 124 and 126 in openings 120 and 122. Bronze bushings 125 and 127 line the bearing members 124 and 126, respectively. The bearing members 124 and 126 carry the shaft 108 within the openings 120 and 122. Coupled to one end of the throttle shaft 108 is linkage member 128 to which is connected throttle return spring 129. Coupled to the other end of the throttle shaft 108 is linkage member 130, which in turn can be coupled to and actuated by the foot pedal of an automobile.

In the known carburetor shown in FIG. 5, vapors from the intake manifold can flow through the openings 120 and 122 along the length of the throttle shaft 108 between the shaft 108 and the bearings 124 and 126.

The present invention overcomes a problem experienced with known carburetors such as the one shown in FIG. 5. In such systems, after a short drive in cold weather, when the engine is turned off, vapors from the intake manifold turn to ice between the throttle shaft and the bearing surface it turns in, and freeze the shaft in the bearing. When the engine later is restarted, depressing the accelerator pedal rotates the throttle shaft, but the shaft remains frozen in the bearing. The throttle return spring is not strong enough to break the shaft free and close the throttle valve. As a result, a vehicle equipped with such a device will accelerate rapidly and without control.

Figure 6:
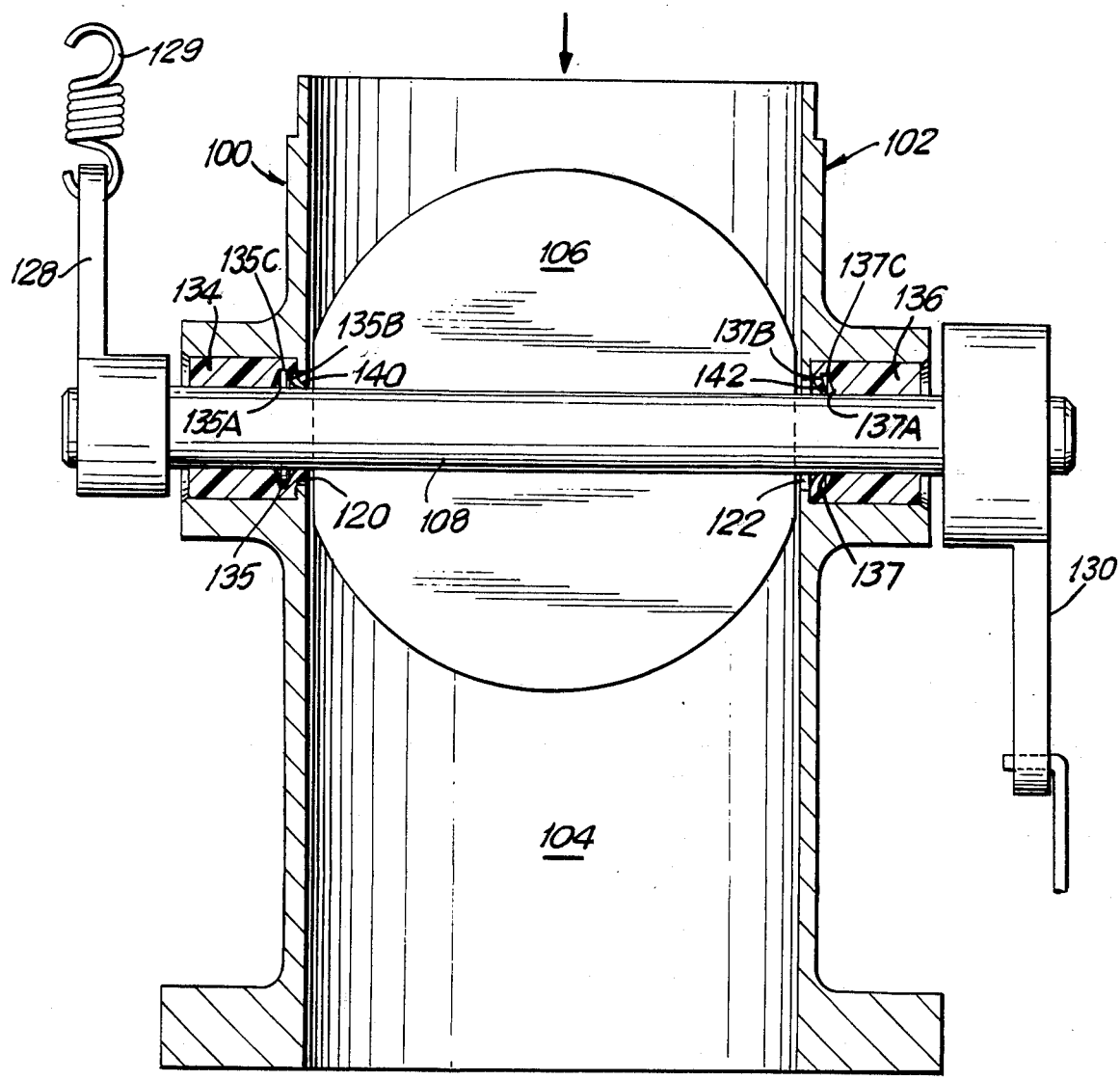
FIG. 6 is a plan view of a section of a carburetor according to an embodiment of the invention with the intake manifold housing cut away.
Figure 7:
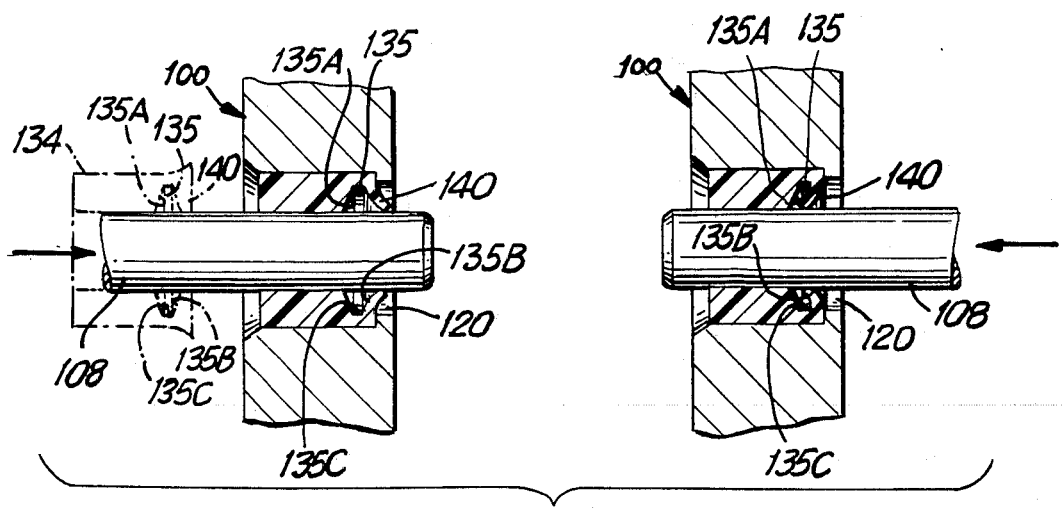
FIG. 7 is diagramatic view of an embodiment of the sealing member of this invention shown prior to and inserted in the intake manifold housing and also showing shafts inserted in the sealing member in opposite ends thereof.

The present invention overcomes the aforementioned problem by providing a thermoplastic sealing means that prevents vapors from entering the spaces between the throttle shaft and the bearing surface it turns in. As shown in FIGS. 6 and 7, such sealing means or bearing members 134 and 136 are one-piece, self-lubricating, thermoplastic tubular or cylindrical shaped bodies.

Grooves 135 and 137 are provided in the inner cylindrically shaped surface thereof in the vicinity of one or both ends of the sealing means or bearing members 134 and 136, respectively. The grooves 135 and 137 are cut in the bearing members in a generally U-shaped configuration. Sidewalls 135A and 137A of the grooves 135 and 137 are cut at an angle of about 15° relative to the transverse axes of the bearing members 134 and 136. Sidewalls 135B and 137B of the grooves 135 and 137 are cut at an angle of about 30° relative to transverse axes of the bearing members 134 and 136. The sidewalls 135A and 135B as well as sidewalls 137A and 137B are cut so as to intersect base portions 135C and 137C, respectively, of grooves 135 and 137. Base portions 135C and 137C are cut so as to be substantially in alignment with the longitudinal axis of the bearing members 134 and 136, respectively. The depths of the grooves 135 and 137 depend upon the thermoplastic material from which sealing means or bearing members 134 and 136 are made, but should be sufficiently deep to permit flange portions 140 and 142 of bearing members 134 and 136 to flex, as discussed more fully herein.

The flange portions 140 and 142 are dimensioned so as to have an outer diameter which is slightly larger than the outer diameter of the bearings 134 and 136 and an inner diameter which is substantially the same as the inner diameter of the bearings 134 and 136. When the bearings are positioned in the manifold housing portions about the throttle shaft 108, the walls of the manifold housing defining the manifold opening 104 press the larger outer diameter of flange portions 140 and 142 radially inwardly and ensure that they are pressed against and provide a seal with the throttle shaft 108. Moreover, after the grooves are machined in the bearing members 134 and 136, the flanges 140 and 142 may flare, up to about 19°, away from the transverse axes of the bearing members 134 and 136.

The sealing means or bearing members 134 and 136 are formed so that there are predetermined clearances between the annular inner surfaces facing the throttle shaft 108 and the annular peripheral surfaces which are situated in mating annular recesses in manifold housing portions 100 and 102. The predetermined clearances are dimensioned so as to permit predetermined deflections of flanges 140 and 142 when the flanges 140 and 142 are in situ, as discussed hereinafter. This is accomplished by making the diameter of the opening in the manifold housing portions 100 and 102 slightly smaller than the outer diameter of the flange portions 140 and 142. The clearance between the annular inner surfaces of bearings 134 and 136 and the outer diameter of the throttle shaft 108 is dimensioned so as to prevent reverse deformation of flanges 140 and 142 when the flanges are in situ, during operation of the carburetor assembly. This is accomplished by keeping the diameter of the throttle shaft 108 slightly smaller than the diameter of the annular inner surfaces of bearing members 134 and 136.

The manifold housing portions 100 and 102 are typically formed of metal which will remain relatively rigid under the operating temperatures and pressures of the carburetor assembly. The bearing and seal members 134 and 136 may be press fit into position in the carburetor assembly. During installation, upon application of (radially inward) pressure, the flanges 140 and 142 are bent radially inward toward the throttle shaft 108 into sealing engagement therewith. The flanges 140 and 142 are bent radially inward such that their inner diameter is smaller than the outer diameter of the shaft 108. Thus, when the shaft 108 is inserted in the bearing members 134 and 136, the flanges 140 and 142 are bent radially inward and in the direction of the insertion. The contact between the bent flanges 140 and 142 and the shaft 108 provides both a seal and a wiping action when the shaft 108 rotates. The angles of sidewalls 135B and 137B are reduced from their initial positions of about 30° to form about 10° to about 20° relative to transverse axes of the bearing members 134 and 136. The peripheral inner annular surfaces of flanges 140 and 142 are urged radially against the outer surface of the throttle shaft 108 and continuously compensate for any irregularities of the shaft surface and maintain the sealing engagement therebetween.

During the initial break-in period of use, it has been found that the peripheral annular sealing surfaces of flange portions 140 and 142, (FIGS. 6 and 7) and the peripheral annular sealing surfaces 22A of flange 22 (FIGS. 1–4) deposit a coating of their thermoplastic material less than about 5 microns in thickness onto the mating annular peripheral surface of the throttle shaft 108, (FIGS. 6–7) or the shaft 24 (FIGS 1–4), respectively. Such deposit provides a seal between surfaces comprised of the same thermoplastic material and assures that there is little or virtually no wear of flanges 140 and 142, or of flange 22, respectively, particularly when the thermoplastic materials contemplated for this invention are employed.

The bearing and sealing members 10 (FIGS. 1–4) and 34 and 36 (FIGS. 6–7) are made of a fluoroplastic such as polytetrafluoroethylene (PTFE); or PTFE containing a wear resistant filler such as polyimide, glass fibers, bronze, carbon, graphite or the like. Particularly preferred is a virgin PTFE or the PTFE disclosed in U.S. Pat. No. 3,652,409. Other suitable fluoroplastics include a perfluoroalkoxy resin having the following repeating units:

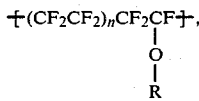

wherein R is $C_nF_{2n+1}$ and n is an integer $\geq 1$; a fluorinated ethylene propylene copolymer (FEP) having the following repeating units:

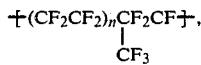

wherein n is an integer $\geq 1$ (melting point of about 310° C.); ethylene-chlorotrifluoroethylene copolymer (ECTFE) (melting point of about 245° C. and a density of 1.68 g/cc which is predominantly 1:1 alternating copolymer product of copolymerizing ethylene and chlorotrifluoroethylene and consisting of linear chains with the predominate repeating units:

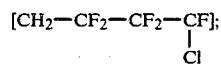

ethylene-tetrafluoroethylene copolymer (melting point of about 270° C. and a density of 1.7 g/cc) which is predominantly 1:1 alternating copolymer of ethylene and tetrafluoroethylene and consisting of linear chains with the repeating unit $CH_2-CH_2-CF_2-CF_2$; and polyvinylidene fluoride (melting point of 170° C. and a density of 1.78 g/cc).

PTFE and PTFE containing one or more wear resistant fillers are preferred materials because of their low frictional properties, their memory, their chemical inertness, and their thermal properties.

The following discussion concerns the manufacture of a bearing and sealing member of this invention (shown in FIGS. 6–7) and refers to PTFE for illustrative purposes. The manufacturing techniques are well known and apply also to the sealing member of this invention shown in FIGS. 1–4.

A PTFE material is molded or machined into an annular tube-like shape having a wall thickness substantially equal to the length of the sealing member to be formed. The wall thickness is sufficient to provide sealing flanges 140 and 142. The wall thickness of the bearing members 134 and 136 is reduced so that the flanges 140 and 142 have a larger outer diameter than the outer diameter of the bearing members 134 and 136.

Two slices are made in the inner walls of the annular tube-like sealing means or bearing members 134 and 136 to a preselected depth sufficient to define the length of the flange portion of the bearing member. A first slice in the inner wall of each of the bearing members 134 and 136 is made in the vicinity of one end of each of the bearing members 134 and 136. The first slice is made at an angle of about 30° relative to a respective transverse axis of the bearing member (134 or 136) passing through the slice. A second slice is made in the vicinity of the first slice but further within each of the bearing members 134 and 136. The second slice is made at an angle of about 15° relative to a respective transverse axis of the bearing member (134 or 136) passing through the slice. Both the first and second slices intersect an inner wall portion of the groove within the bearing member. A predetermined thickness of the inner walls of the bearing members 134 and 136 is cut away to a predetermined depth to define wall portions 135C and 137C which are in alignment with the longitudinal axis of the bearing members 134 and 136, respectively.

It will be apparent to those skilled in that art that various changes, modifications and uses of the present invention are possible without departing from the spirit of the invention or the scope of the appended claims in light of the above teachings.

What is claimed is:

1. A one-piece, self-lubricating, thermoplastic bearing and sealing member suitable for sealing a moveable shaft, said bearing and sealing member comprised of an annular shaped body having an inner annular conduit extending axially therethrough, the conduit having a cross-sectional area adapted to receive the shaft, the walls of said conduit having a radially inwardly extending annular recess and a resilient flange radially extending from said walls into said conduit, the recess being located in the vicinity of one axial end of the conduit and the flange being located adjacent to and axially outward of said recess the flange being capable of being bent to a preselected angle below about 20° relative to a transverse axis of the conduit and having a memory which urges it to return to its initial prebent position, the flange being integrally formed with the body and projecting radially inwardly into said conduit to an extent that when the shaft is inserted in the conduit at one end thereof nearest said flange and recess, the flange is bent into said recess by the axial disposition of the shaft within the conduit to said preselected angle, and when the shaft is inserted in the conduit at the opposite end thereof farthest from said flange and recess, the flange is bent by the axial disposition of the shaft within the conduit to said preselected angle away from said recess, peripheral portions of said flange being placed in continuous contact under tension with the outer circumference of the shaft providing a sealing engagement therebetween when said shaft is inserted within the conduit.

2. The bearing and sealing member of claim 1 where the flange is located at one end of the conduit such that when a shaft is inserted in the opposite end of the conduit, the flange is bent by the axial disposition of said shaft within the conduit to said preselected angle away from the recess adjacent thereto and axially outwardly of the conduit.

3. The bearing and sealing member of claim 1 having a flange and a recess at each end of said conduit.

4. The bearing and sealing member of claim 1 having a cylindrically shaped body and cylindrically shaped central conduit extending therethrough.

5. The bearing and sealing member of claim 1 wherein said thermoplastic is a fluoroplastic selected from the group consisting of polytetrafluoroethylene containing up to 60 percent by weight of a wear resistant filler selected from polyimide, glass fibers, bronze, carbon, and graphite; a perfluoroalkoxy resin having the following repeating units:

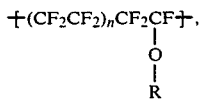

wherein R is $C_nF_{2n+1}$ and n is an interger $\geq 1$; a fluorinated ethylenepropylene having the following repeating units:

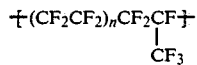

wherein n is an integer $\geq 1$; ethylene-chlorotrifluoroethylene copolymer, ethylene-tetrafluoroethylene copolymer; and polyvinylidene fluoride.

6. The bearing and sealing member as defined in claim 5 wherein said thermoplastic is polytetrafluoroethylene containing up to 60 percent by weight of a wear resistant filler selected from polyimide, glass fibers, bronze, carbon or graphite.

7. The bearing and sealing member of claim 1 wherein said preselected angle is between about 3° and 11°.

8. The bearing and sealing member of claim 1 wherein said thermoplastic is polytetrafluoroethylene containing up to 60 percent by weight of a wear resistant filler selected from polyimide, glass fibers, bronze, carbon and graphite; and wherein said preselected angle is between about 3° and about 11°.

9. A one-piece, self-lubricating, thermoplastic bearing and seal member suitable for carrying a throttle shaft located within a carburetor assembly, said shaft capable of rotatably moving within said assembly about its longitudinal axis, or reciprocally moving within said assembly, said bearing and seal member comprised of an annular shaped body having a central opening adapted to mate with said shaft, an inner wall portion of said annular shaped body containing an annular groove dimensioned so as to define a flexible and resilient flange at one end of the annular shaped body, said flange extending away from said annular shaped body at a preselected angle below about 20° relative to a transverse axis thereof, the flange portion of said annular shaped body having an outer diameter which is larger than the outer diameter of said annular shaped body and an inner diameter which is substantially the same as said central opening, said flange, upon application of a radially inward force thereto, capable of being bent so that its inner diameter is smaller than the diameter of said central opening, said bearing and seal member adapted for disposition in an annular space between said throttle shaft and the carburetor housing so that a peripheral wall portion of the bearing and seal member is fixedly secured within said carburetor housing, and so that the peripheral portion of said flange is bent radially inwardly and placed in continuous contact under tension with the annular outer surface of said throttle shaft, providing a discrete sealing engagement therebetween.

10. The bearing and sealing member of claim 9 where the flange is located at one end of the central opening such that when a shaft is inserted in the opposite end of the central opening, the flange is bent by the axial disposition of said shaft within the central opening to said preselected angle away from the recess adjacent thereto and axially outwardly of the central opening.

11. The bearing and sealing member of claim 9 having a flange and a recess at each end of said central opening.

12. The bearing and sealing member of claim 9 having a cylindrically shaped body and cylindrically shaped central opening extending therethrough.

13. The bearing and sealing member of claim 9 wherein said thermoplastic is a fluoroplastic selected from the group consisting of polytetrafluoroethylene containing up to 60 percent by weight of a wear resistant filler selected from polyimide, glass fibers, bronze, carbon, and graphite; a perfluoroalkoxy resin having the following repeating units:

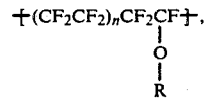

wherein R is $C_nF_{2n+1}$ and n is an integer $\geq 1$; a fluorinated ethylenepropylene having the following repeating units:

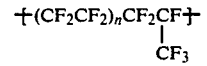

wherein n is an integer $\geq 1$; ethylene-chlorotrifluoroethylene copolymer, ethylene-tetrafluoroethylene copolymer; and polyvinylidene fluoride.

14. The bearing and sealing member of claim 13 wherein said thermoplastic is polytetrafluoroethylene containing up to 60 percent by weight of a wear resistant filler selected for polyimide, glass fibers, bronze, carbon or graphite.

15. The bearing and sealing member of claim 9 wherein said preselected angle is between about 3° and 11°.

16. The bearing and sealing member of claim 9 wherein said thermoplastic is polytetrafluoroethylene containing up to 60 percent by weight of a wear-resistant filler selected from polyimide, glass fibers, bronze, carbon and graphite; and wherein said preselected angle is between about 3° and about 11°.

* * * * *